United States Patent Office 3,436,185
Patented Apr. 1, 1969

3,436,185
SPOT TEST TO DIFFERENTIATE BETWEEN ALLOYS, 90–10 COPPER-NICKEL AND 70–30 COPPER-NICKEL
David M. Zall, Anne Arundel County, Md., assignor to the United States of America as represented by the Secretary of the Navy
No Drawing. Filed July 20, 1966, Ser. No. 566,714
Int. Cl. G01n 31/22, 31/00
U.S. Cl. 23—230        7 Claims The invention described herein may be manufactured and used by or for the Government of the United States of America for governmental purposes without the payment of any royalties thereon or therefor.

This invention relates to a method of non-destructive chemical identification testing of copper and nickel alloys and more particularly to a spot test for differentiating between Monel, 90–10 copper-nickel (90% Cu, 10% Ni) and 70–30 copper-nickel (70% Cu, 30% Ni) alloys.

In recent years the use of copper and nickel alloys has become widespread in areas where high strength, toughness and corrosion resistance are necessary. (The term "copper and nickel alloys" is used herein as generic to Monel and copper-nickel alloys.) A particularly extensive application for such alloys is in environments which are exposed to the corrosion effects of fresh and salt water. Such alloys have been used in pumps, propellers, tanks, pipes, fasteners, studs, bolts and other related equipment.

A particular problem encountered when using materials composed of such alloys is identifying the component alloy. In order to maintain the integrity of a system and insure maximum reliability it is essential that components made of the same alloy composition be used to the fullest extent possible throughout the system. Because such alloys have a similar physical appearance their identification, particularly in the field, has been difficult.

Although chemical tests have been heretofore proposed for identifying particular copper and nickel alloys such tests suffer from several disadvantages. For instance, many tests had to be conducted in a laboratory environment with skilled chemists using elaborate facilities working under scientifically favorable conditions. Furthermore, many tests required complex equipment or reagents which were difficult to handle and/or dangerous to use. In addition, no test was heretofore available which could accurately and reliably distinguish, by means of a characteristic color spot, between Monel and other copper-nickel alloys.

It is therefore an object of this invention to provide a method for identifying alloys comprised of copper and nickel.

It is another object of this invention to provide a simple chemical spot test for identifying Monel (as well as K-Monel), 90–10 copper-nickel or 70–30 copper-nickel.

A further object of this invention is to provide a test for distinguishing between several types of copper and nickel alloys which is reliable, accurate and which can be conducted in the field under adverse conditions and without the need for highly trained personnel.

With these and other objects in view, the present invention contemplates a method including the steps of preparing the surface of the specimen to be tested by cleaning, depositing a small quantity of concentrated ammonium hydroxide on a circle of filter paper and then pressing the filter paper against the cleaned specimen. After several minutes the filter paper is removed and then treated with a small amount of saturated acetone solution of 5-(p-dimethyl aminobenzylidene) rhodanine. This technique will cause a distinctive color spot to appear on the paper. A scarlet red color indicates the presence of either 70–30 or 90–10 copper-nickel alloy; yellow color indicates Monel metal. The type of copper-nickel alloy may then be ascertained by treating the filter paper having the scarlet red spot with a small quantity of ammonium hydroxide. The appearance of an outer blue ring determines that it is 90–10 copper-nickel alloy.

A specific example of a method by which the invention may be successfully practiced is as follows: The specimen to be tested is scrupulously cleaned to obtain a smooth reactive surface free from paint, dirt, grease, oil and oxide film. For removing paint, great and grime any suitable solvent may be used. The dark colored oxide film which usually forms on such alloys may be removed with the use of fine sandpaper or a file.

Next, one drop of concentrated ammonium hydroxide is placed on a circle of filter paper. Preferably, the filter paper is of the fiber glass type measuring 2.4 cm. in diameter. The ammonium hydroxide wetted fiber glass filter paper is pressed against the area or the specimen which has been cleaned using a rubber stopper or finger stall to insure good contact with the metal and to avoid contamination from the fingers or hand. The filter paper is allowed to remain in place for approximately three minutes to complete the reaction. It is then removed and placed on a clean spot plate. (At this time a light blue colored spot may be noticed indicating 90–10 copper-nickel, however further testing will confirm the indication positively.)

The spot color is developed by applying one drop of a saturated acetone solution of 5-(p-dimethyl aminobenzylidene) rhodanine to the filter paper. A color change will immediately appear identifying the alloy. Copper-nickel alloy (either 70–30 and 90–10) will be indicated by a bright scarlet red color while a yellow color identifies Monel metal.

An indication showing the presence of copper-nickel alloy (scarlet red) may be subjected to further testing to ascertain whether it is 70–30 or 90–10 copper-nickel. A drop of concentrated ammonium hydroxide is placed on the scarlet red spot. A blue ring appearing around the red spot indicates that the alloy is 90–10 copper-nickel.

To insure maximum reliability a control test should be performed simultaneously on a specimen of copper and nickel alloy of known composition.

The chemical basis which enables the above test to be carried out is founded upon the reaction of ammonia and copper. It was found that concentrated ammonia will dissolve copper preferentially from the surface of a copper-nickel alloy, but will not dissolve the copper from the surface of a Monel alloy. Based on the principle of selective solubility, copper was chosen as the "tag" element to be determined in spot testing the various copper and nickel alloys. At room temperature, given a sufficient amount of time (approximately three minutes) enough copper is dissolved by the concentrated ammonia from the surface of a copper-nickel alloy to yield a positive reaction while a negative reaction results from a Monel specimen because not enough copper is dissolved.

The dissolved copper reacts with 5-(p-dimethyl aminobenzylidene) rhodanine in the slightly basic medium afforded by the ammonia solution causing the resulting color change.

Having described the invention, it will be obvious that many modifications will be apparent to one skilled in the art, and, consequently, the scope of the invention is to be measured solely by the following claims.

What is claimed is:

1. A spot test for distinguishing between alloys of copper and nickel by means of color development which comprises the steps of:

contacting the surface of a specimen of a copper and nickel alloy of unknown composition with concentrated ammonium hydroxide solution; and reacting said contacted solution with a saturated acetone solution of 5-(p-dimethyl aminobenzylidene) rhodanine whereby the resulting color will be yellow in the case where said alloy is Monel and scarlet red in the case where said alloy is copper-nickel.

2. A spot test as set forth in claim 1 wherein:
said surface of said specimen is cleaned before being contacted with said concentrated ammonium hydroxide solution.

3. A spot test as set forth in claim 1 wherein:
said surface is contacted with said concentrated ammonium hydroxide solution by means of filter paper applied to said surface.

4. A spot test as set forth in claim 3 wherein:
said filter paper is comprised of fiber glass.

5. A spot test as set forth in claim 3 wherein:
said filter paper is removed from said surface after an interval of several minutes and saturated acetone solution of 5-(p-dimethyl aminobenzylidene) rhodanine is applied to said filter paper to develop said color.

6. A spot test as set forth in claim 5 further including the step of:

applying a small quantity of concentrated ammonium hydroxide to said filter paper when the color which is developed is scarlet red whereby a blue ring appears in the case of said specimen being 90%–10% copper-nickel alloy and no ring appears in the case of said specimen being 70%–30% copper-nickel alloy.

7. A spot test as set forth in claim 5 wherein:
said interval is on the order of three minutes.

References Cited

UNITED STATES PATENTS

| 2,360,644 | 10/1944 | Brown | 23—230 |
| 2,452,036 | 10/1948 | Clardy | 23—230 |

OTHER REFERENCES

Navratil, O.: Chem. Abstr. 64, 15064d, 1966.
Ayres, G. H., et al.: Anal. Chem. 11, No. 7, July 1959, pp. 365–367.

MORRIS O. WOLK, *Primary Examiner.*

R. M. REESE, *Assistant Examiner.*

U.S. Cl. X.R.

23—253; 252—408